United States Patent
Hwang (10) Patent No.: US 7,893,954 B2
(45) Date of Patent: Feb. 22, 2011

(54) MOBILE COMMUNICATION TERMINAL AND METHOD OF VIDEO COMMUNICATIONS THEREOF

(75) Inventor: In Hui Hwang, Ansan-si (KR)

(73) Assignee: LG Electronics Inc., Seoul (KR)

( * ) Notice: Subject to any disclaimer, the term of this patent is extended or adjusted under 35 U.S.C. 154(b) by 1232 days.

(21) Appl. No.: 11/457,870

(22) Filed: Jul. 17, 2006

(65) Prior Publication Data

US 2007/0013768 A1 Jan. 18, 2007

(30) Foreign Application Priority Data

Jul. 18, 2005 (KR) ...................... 10-2005-0064762

(51) Int. Cl.
*H04N 7/14* (2006.01)
(52) U.S. Cl. ................................ 348/14.02; 348/14.04
(58) Field of Classification Search .............. 348/14.02, 348/14.01, 14.04
See application file for complete search history.

(56) References Cited

U.S. PATENT DOCUMENTS

| | | | |
|---|---|---|---|
| 2003/0142200 A1 | 7/2003 | Canova, Jr. et al. | 348/14.08 |
| 2004/0204020 A1 | 10/2004 | Kuramitsu | 455/550.1 |
| 2005/0151871 A1 | 7/2005 | Minami | 348/333.01 |

FOREIGN PATENT DOCUMENTS

| | | |
|---|---|---|
| CN | 1261241 A | 7/2000 |
| CN | 1496181 A | 5/2004 |
| CN | 1540986 A | 10/2004 |
| CN | 1574872 A | 2/2005 |
| GB | 2 320 657 A | 6/1998 |
| JP | 2002-185943 A | 6/2002 |
| JP | 2004-007537 A | 1/2004 |
| JP | 2004-328741 A | 11/2004 |
| JP | 2004-343427 | 12/2004 |
| JP | 2005-018576 | 1/2005 |
| JP | 2005-191708 | 7/2005 |
| JP | 2006-211137 | 8/2006 |
| KR | 10-2000-0037103 | 7/2000 |
| KR | 10-2004-0035522 A | 4/2004 |
| KR | 10-2004-0045135 A | 6/2004 |
| WO | WO 02/03728 A1 | 1/2002 |
| WO | WO 02/096111 A1 | 11/2002 |
| WO | WO2004/084527 | 9/2004 |

OTHER PUBLICATIONS

Japanese Office Action dated Feb. 23, 2010 for Application No. 2006-196054.

(Continued)

*Primary Examiner*—Stella L Woo
(74) *Attorney, Agent, or Firm*—KED & Associates LLP (57) ABSTRACT

A mobile communication terminal and method of video communications thereof are disclosed, by which a broadcast program currently received by the mobile communication terminal can be transmitted to a correspondent terminal by real time using the video communications. The present invention includes a transceiver unit connecting a video call, a broadcast receiving unit receiving a broadcast program, a codec decoding the received broadcast program, and a control unit controlling the decoded broadcast program to be transmitted using the video call.

10 Claims, 10 Drawing Sheets

OTHER PUBLICATIONS

Korean Office Action dated Jun. 20, 2007.
European Search Report dated Mar. 20, 2009.
Chinese Office Action dated Feb. 27, 2009.
English language Abstract of KR 10-2000-0037103, Jul. 5, 2000.
Japanese Office Action dated Jun. 8, 2010.
Japanese Office Action dated Oct. 5, 2010.

FIG. 8

# MOBILE COMMUNICATION TERMINAL AND METHOD OF VIDEO COMMUNICATIONS THEREOF

This application claims the benefit of the Korean Patent Application No. 10-2005-0064762, filed on Jul. 18, 2005, which is hereby incorporated by reference as if fully set forth herein.

BACKGROUND OF THE INVENTION

1. Field of the Invention

The present invention relates to a mobile communication terminal, and more particularly, to a mobile communication terminal and method of video communications thereof. Although the present invention is suitable for a wide scope of applications, it is particularly suitable for a video communication function.

2. Discussion of the Related Art

Generally, the recent developments of mobile communication associated technologies enable a mobile communication terminal to be provided with various functions. In particular, functions associated with multimedia technology are provided to the mobile communication terminal.

For example, a mobile communication terminal is equipped with a camera to enable a video communication function. So, the mobile communication terminal is able to perform the video communications based on various multimedia as well as voice communications.

Besides, mobile communication terminal associated standards and technologies such as DMB (digital multimedia broadcasting), DVB-H (digital video broadcasting-handheld), Media FLO (media forward link only) and the like rise to enable receptions of broadcast programs while a mobile communication terminal is moving.

A configuration of a mobile communication terminal capable of video communications according to a related art is explained with reference to FIG. 7 as follows.

Figure 7:
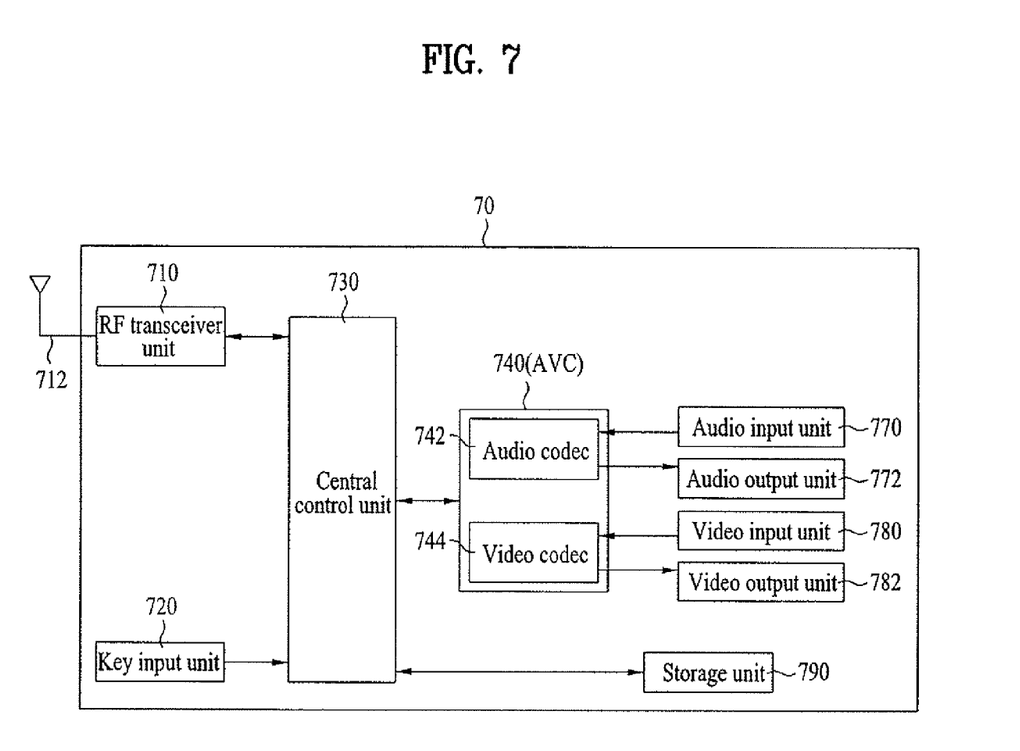
FIG. 7 is a block diagram of a mobile communication terminal capable of video communications according to a related art.

FIG. 7 is a block diagram of a mobile communication terminal capable of video communications according to a related art.

Referring to FIG. 7, a mobile communication terminal 70 consists of an RF transceiver unit 710 performing radio communications with a base station via an antenna 712, a key input unit 720 receiving a signal from a user, a central control unit 730 controlling overall actions of video communications by setting up a video call, an AVC (audio video codec) 740 encoding or decoding an input video and an input audio for the video call, an audio input unit 770 receiving an audio from outside, a video input unit 780 receiving a video from outside, an audio output unit 772 outputting an audio received from a correspondent terminal, a video output unit 782 outputting a video received from the correspondent terminal, and a storage unit 790 storing programs and various data therein.

The mobile communication terminal 70 receives audio and video of a user of the mobile communication terminal itself via the audio input unit 770 and the video input unit 780, encodes the received audio and video and then transmits the encoded audio and video to the correspondent terminal.

The mobile communication terminal 70 decodes video and audio received from the correspondent terminal and then outputs the decoded video and audio via the video output unit 782 and the audio output unit 772, respectively.

In this case, the mobile communication terminal 70 is able to transmit a still picture or moving pictures stored in the storage unit 790 instead of the user's video received via the video input unit 780.

A configuration of a mobile communication terminal capable of video communications according to a related art is explained with reference to FIG. 8 as follows.

Figure 8:
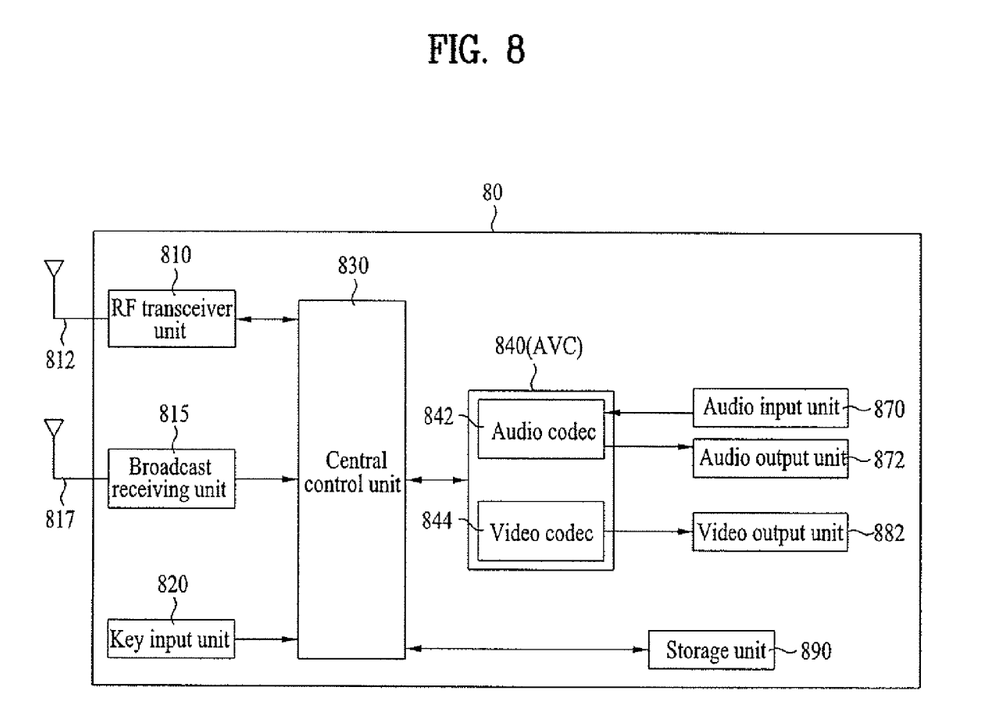
FIG. 8 is a block diagram of a mobile communication terminal capable of receiving broadcasts according to a related art.

FIG. 8 is a block diagram of a mobile communication terminal capable of receiving broadcasts according to a related art.

Referring to FIG. 8, a mobile communication terminal 80 consists of an RF transceiver unit 810 performing radio communications with a base station via a first antenna 812, a broadcast receiving unit 815 receiving a broadcast program via a second antenna 817, a key input unit 820 receiving various signals from a user, a central control unit 830 controlling a broadcast reception and overall actions of video communications, an AVC (audio video codec) 840 encoding or decoding an audio for voice communications and decoding a received broadcast program, an audio input unit 870 receiving a voice of a user, an audio output unit 872 outputting an audio received from a correspondent terminal, a video output unit 882 outputting a video of the received broadcast program, and a storage unit 890 storing programs and various data therein.

The mobile communication terminal 80 receives the broadcast program via the second antenna 817, decodes the received broadcast program in the AVC 840, and then outputs the decoded broadcast program via the video output unit 882. So, the user is able to view the broadcast program.

However, in the related art mobile communication terminal capable of the video communications and the related art mobile communication terminal capable of a broadcast reception, since the standard for the video communications differs from the standard for the broadcast reception, the mobile communication terminal should support the corresponding standard for the video communications or the broadcast reception.

Moreover, if both of the video communications and the broadcast program reception are activated using the related art mobile communication terminal, it is unable to transmit the broadcast program to a correspondent terminal using the video communications.

SUMMARY OF THE INVENTION

Accordingly, the present invention is directed to a mobile communication terminal and method of video communications thereof that substantially obviate one or more problems due to limitations and disadvantages of the related art.

An object of the present invention is to provide a mobile communication terminal and method of video communications thereof, by which a broadcast program currently received by the mobile communication terminal can be transmitted to a correspondent terminal by real time using the video communications.

Another object of the present invention is to provide a mobile communication terminal and method of video communications thereof, by which the mobile communication terminal is able to receive a broadcast program from a correspondent terminal in the video communications by real time despite failing to support a broadcast program receiving function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal, which has a video communications function, according to the present invention includes a transceiver unit connecting a video call, a broadcast receiving unit receiving a broadcast program, a codec decoding the received broadcast program, and a control unit controlling the decoded broadcast program to be transmitted using the video call.

Preferably, the mobile communication terminal further includes a video input unit receiving a video from outside.

More preferably, the mobile communication terminal further includes a video processing unit synthesizing a video of the received broadcast program and the video received via the video input unit into a synthetic video. More preferably, the video processing unit synthesizes the videos to display the video received via the video input unit on a partial area of the video of the received broadcast program. More preferably, the control unit sets an input video for the video call to the synthetic video.

Preferably, the control unit sets an input video for the video call to the video of the received broadcast program.

Preferably, the control unit sets an input audio for the video call to an audio of the received broadcast program.

In another aspect of the present invention, a method of video communications includes the steps of decoding a received broadcast program, connecting a video call, deciding whether to transmit the decoded broadcast program using the video call, setting an input for the video call to the decoded broadcast program as a result of the deciding step, and transmitting the broadcast program using the video call if the decoded broadcast program is set as an input.

Preferably, the method further includes the step of receiving a video from outside.

More preferably, the method further includes the step of synthesizing a video of the received broadcast program and the received video into a synthetic video. More preferably, in the synthesizing step, the received video is synthesized to be displayed on a partial area of the video of the received broadcast program. More preferably, in the setting step, an input video for the video call is set to the synthetic video.

Preferably, in the setting step, an input video for the video call is set to the video of the received broadcast program.

Preferably, in the setting step, an input audio for the video call is set to an audio of the received broadcast program.

In another aspect of the present invention, a method of video communications includes the steps of receiving a video call including a broadcast program, decoding the broadcast program, detecting video or audio from the broadcast program, and outputting the detected video or audio as output video or output audio of the video call.

Preferably, in the outputting step, both a user video and the detected video are output simultaneously, and the user video is the video received by terminal transmitting the video call.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a configuration of a mobile communication terminal capable of transmitting a broadcast program using a video call according to one embodiment of the present invention is explained in detail with reference to FIG. 1 as follows.

Figure 1:
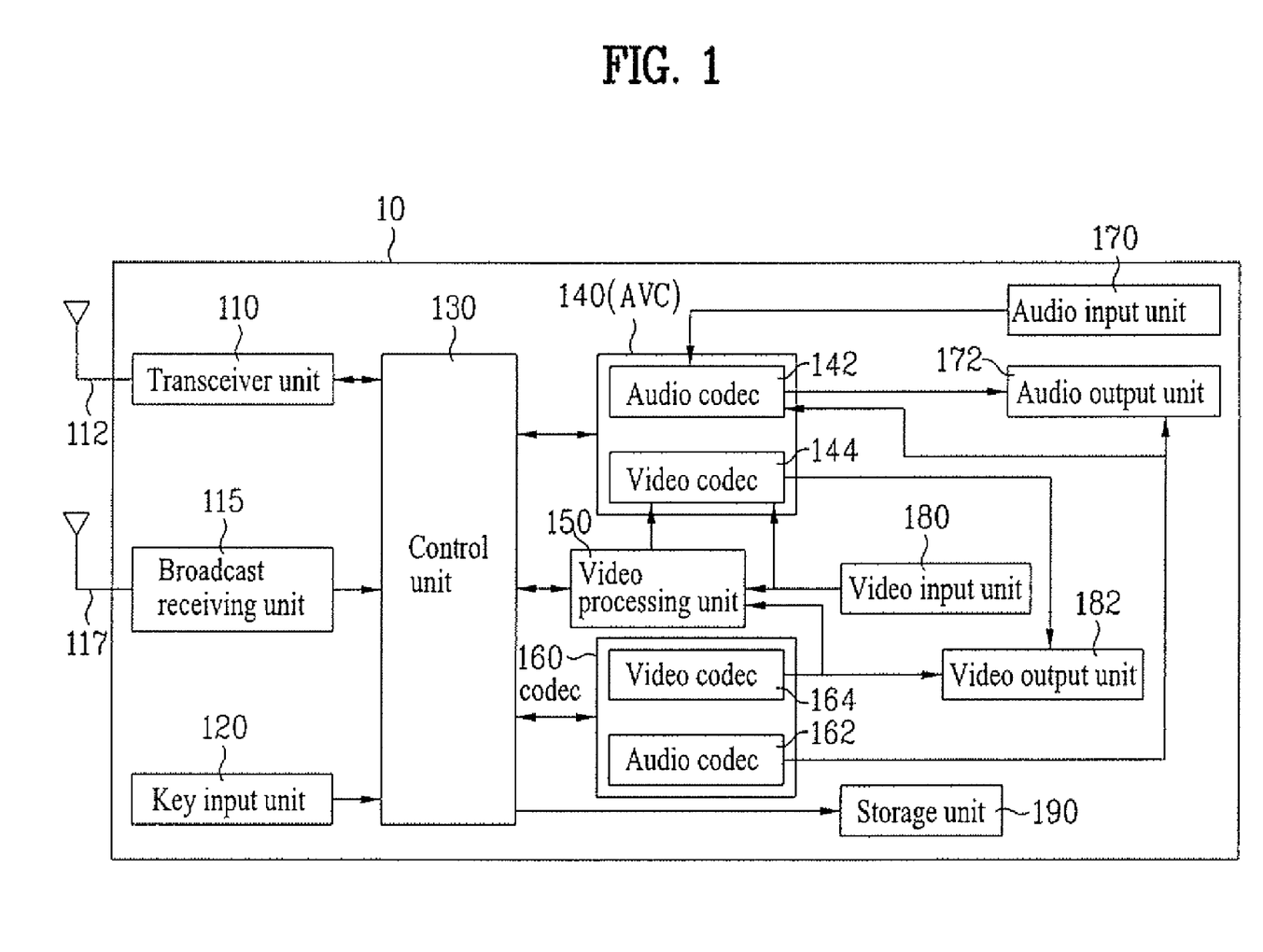
FIG. 1 is a block diagram of a mobile communication terminal capable of transmitting a broadcast program using a video call according to one embodiment of the present invention.

FIG. 1 is a block diagram of a mobile communication terminal capable of transmitting a broadcast program using a video call according to one embodiment of the present invention.

Referring to FIG. 1, a mobile communication terminal 10 according to one embodiment of the present invention includes a transceiver unit 110 performing radio communications with a base station via a first antenna 112, a broadcast receiving unit 115 receiving a broadcast program via a second antenna 117, a key input unit 120 generating a signal corresponding to a key selected by a user, a control unit 130 controlling the received broadcast program to be transmitted to a correspondent mobile communication terminal, an AVC (audio video codec) 140 encoding or decoding a video or audio for video communications, a video processing unit 150 synthesizing a video of the received broadcast program and an inputted video into one video, a codec 160 decoding the received broadcast program, and a storage unit 190 storing various programs and data therein.

And, the mobile communication terminal 10 further includes an audio input unit 170 receiving an audio from outside, a video input unit 180 receiving a video from outside, an audio output unit 172 outputting an audio received from the correspondent mobile communication terminal, and a video output unit 182 outputting a video received from the correspondent mobile communication terminal.

First of all, the transceiver unit 110 receives a radio signal according to the video communications with the correspondent mobile communication terminal via the first antenna 112 for transmission/reception of the radio signal.

If a specific broadcast program is selected by a user using the key input unit 120, the broadcast receiving unit 115 receives the selected broadcast program via the second antenna 117. In doing so, the broadcast program is received using the standards supporting digital broadcast programs such as DMB (digital multimedia broadcasting), DVB-H (digital video broadcasting-handheld), Media FLO (media forward link only) and the like.

According to a selection made by the user, the control unit 130 controls the received broadcast program to be set as an input of a video call to replace the audio or video received from the audio input unit 170 or the video input unit 180.

The control unit 130 controls the broadcast program to be transmitted to the correspondent mobile communication terminal using the video call. In this case, the control unit 130 sets an input video for the video call to the video of the received broadcast program. And, the control unit 130 sets an input audio for the video call to the audio of the received broadcast program.

According to a selection made by the user, the control unit 130 sets the input video for the video call to a synthetic video obtained from synthesizing the video of the received broadcast program and the video inputted via the video input unit 130. In doing so, the control unit 130 controls the video processing unit 150 to synthesize the video of the broadcast program and the inputted video into one video.

The AVC 140 includes an audio codec 142 performing encoding or decoding on an audio and a video codec 144 performing encoding or decoding on a video.

The audio codec 142 encodes or decodes a user's audio received via the audio input unit 170 and a correspondent party's audio received via the transceiver unit 110.

In particular, in order to transmit the received broadcast program using the video call, the audio codec 142 receives an audio of the broadcast program outputted from the codec 160 instead of receiving the user's audio.

And, the video codec 144 encodes or decodes a user's video received via the video input unit 180 and a correspondent party's video received via the transceiver unit 110.

In particular, in order to transmit the received broadcast program using the video call, the video codec 144 receives a video of the broadcast program outputted from the codec 160 instead of receiving the user's video. Alternatively, a video inputted to the video codec 144 could be a synthetic video synthesized by the video processing unit 150, which will be explained in the following description.

In order to transmit the received broadcast program to the correspondent mobile communication terminal, the video processing unit 150 synthesizes the video of the received broadcast program and the video inputted via the video input unit 180 into one video. In particular, the video processing unit 150 generates one synthetic video using the user's video received via the video input unit 180 and the video of the broadcast program decoded by the codec 160.

For instance, the video processing unit 150 performs synthesis in a manner that the video received through the video input unit 180 can be displayed on a partial area of the video of the received broadcast program.

The codec 160 includes an audio codec 162 decoding the audio of the received broadcast program and a video codec 164 decoding the video of the received broadcast program. In this embodiment of the present invention, the codec 160 is configured separate from the AVC 140. Yet, the codec 160 can be combined with the AVC 140 to enable both of the video communications and the broadcast reception.

The audio input unit 170 is a microphone connection part of the mobile communication terminal 10 and receives the user's audio to output to the AVC 140.

The audio output unit 172 is a device including a speaker or earphone of the mobile communication terminal 10 and outputs the correspondent party's audio received via the transceiver unit 110 or the audio of the broadcast program decoded by the codec 160.

The video input unit 180 is a device including a camera provided to the mobile communication terminal 10. The video input unit 130 receives the user's video and then outputs the received video to the AVC 140. Meanwhile, in case of attempting to transmit the broadcast program using the video call, the video input unit 180 outputs it to the video processing unit 150.

The video output unit 182 is a display device of the mobile communication terminal 10. The video output unit 182 outputs the correspondent party's video received via the transceiver unit 110 or the video of the broadcast program decoded by the codec 160.

The storage unit 190 stores a still picture or moving pictures usable as a substitute video of the video call. In particular, the storage unit 190 stores the synthetic video synthesized by the video processing unit 150 as well as the received broadcast program.

A method of transmitting a broadcast program using a video call according to one embodiment of the present invention is explained in detail with reference to FIG. 2 as follows.

Figure 2:
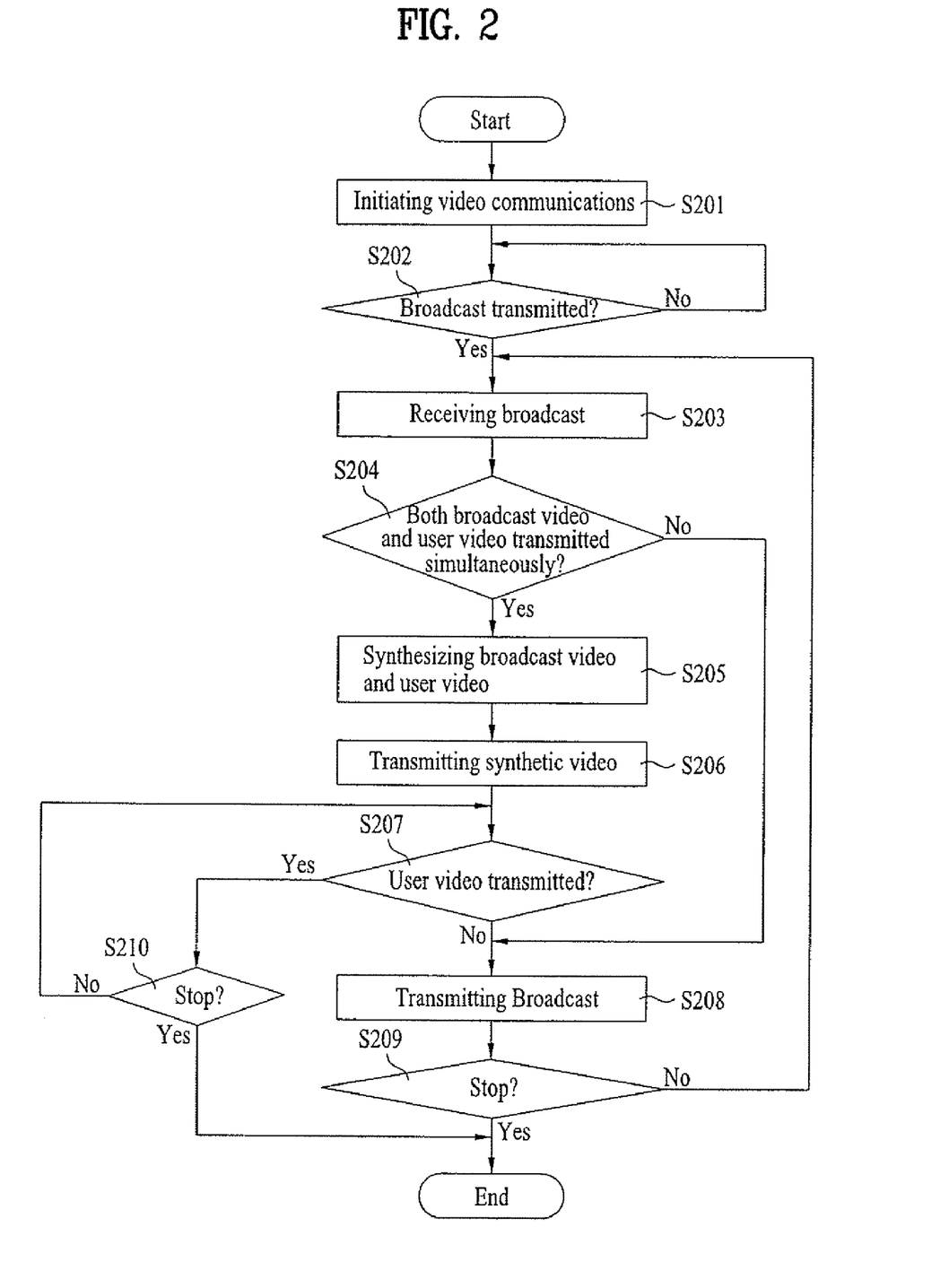
FIG. 2 is a flowchart of a method of transmitting a broadcast program using a video call according to one embodiment of the present invention.

FIG. 2 is a flowchart of a method of transmitting a broadcast program using a video call according to one embodiment of the present invention.

Referring to FIG. 2, the mobile communication terminal 10 sets up a video call with a correspondent mobile communication terminal and then initiates video communications (S201). If so, a method of transmitting a broadcast program using the video call is initiated in the course of the video communications.

Figure 4A:
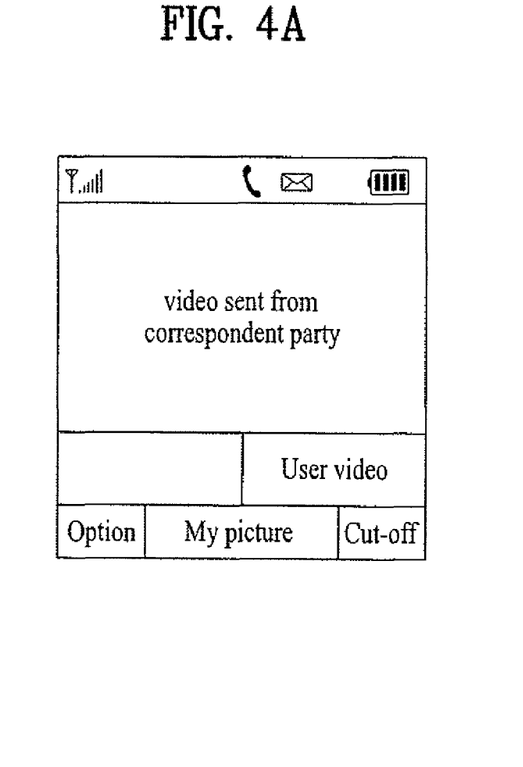
FIG. 4A is a diagram of a screen for displaying a status of a video output unit in video communications of a mobile communication terminal according to a first embodiment of the present invention.

In this case, the video output unit 182 of the mobile communication terminal 10, as shown in FIG. 4A, displays a video received from the correspondent mobile communication terminal and a user's video received via the video input unit 180 for the video communications.

The control unit 130 receives a broadcast program according to a user's selection and then decides whether to transmit the received broadcast program to the correspondent mobile communication terminal (S202).

In this case, while the video communications are in progress, the control unit 130 keeps monitoring whether there is an input signal according to the user's selection.

In case of deciding to receive and to transmit the broadcast program, the control unit 130 sets up a status that the broadcast program can be received by the broadcast receiving unit 115.

The broadcast receiving unit 115 receives the broadcast program via the second antenna 117 according to a control signal of the control unit 130 (s203).

In this case, the codec 160 decodes the received broadcast program and then outputs the decoded broadcast program to the video output unit 182.

And, the broadcast receiving unit 115 receives the broadcast program using the standards supporting digital broadcast programs such as DMB (digital multimedia broadcasting), DVB-H (digital video broadcasting-handheld), Media FLO (media forward link only) and the like.

Figure 4B:
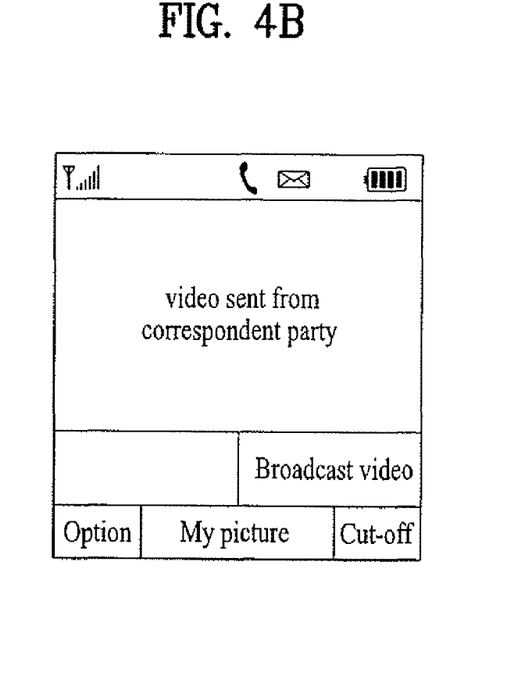
FIG. 4B is a diagram of a screen for displaying a status of a video output unit in video communications of a mobile communication terminal according to a second embodiment of the present invention.

In this case, the video output unit 182, as shown in FIG. 4B, outputs the video of the broadcast program inputted from the codec 160 instead of outputting the user's video inputted via the video input unit 180.

According to a user's selection, the control unit 130 decides whether to transmit both of the video of the received broadcast program and the user's video simultaneously (S204).

In case of deciding to transmit both of the video of the received broadcast program and the user's video simultaneously, the control unit 130 controls the video processing unit 150 to generate a synthetic video using the video of the broadcast program and the user's video.

According to the control signal of the control unit 130, the video processing unit 150 synthesizes the received videos into one video using the user's video inputted from the video input unit 180 and the video of the broadcast program inputted from the codec 160 (S205).

In this case, the video processing unit 150 synthesizes the videos in a manner that the user's video is displayed on a partial area of the video of the broadcast program. In doing so, the video processing unit 150 is able to provide various synthetic videos generated in various ways.

The transceiver unit 110 transmits the synthetic video synthesized by the video processing unit 150 to the correspondent mobile communication terminal (S206).

In this case, according to the control signal of the control unit 130, the AVC 140 receives the synthetic video from the video processing unit 150 and sets an input video for the video call to the synthetic video.

Figure 4C:
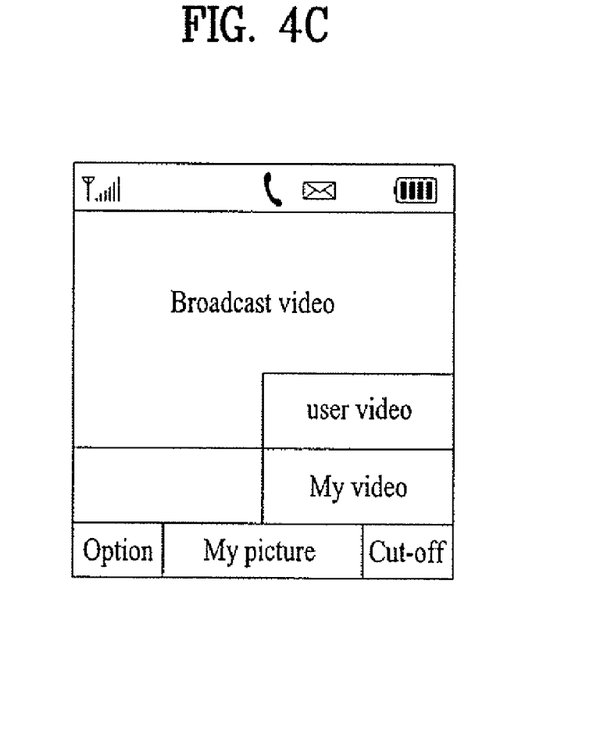
FIG. 4C is a diagram of a screen for displaying a status of a video output unit in video communications of a mobile communication terminal according to a third embodiment of the present invention.
Figure 4D:
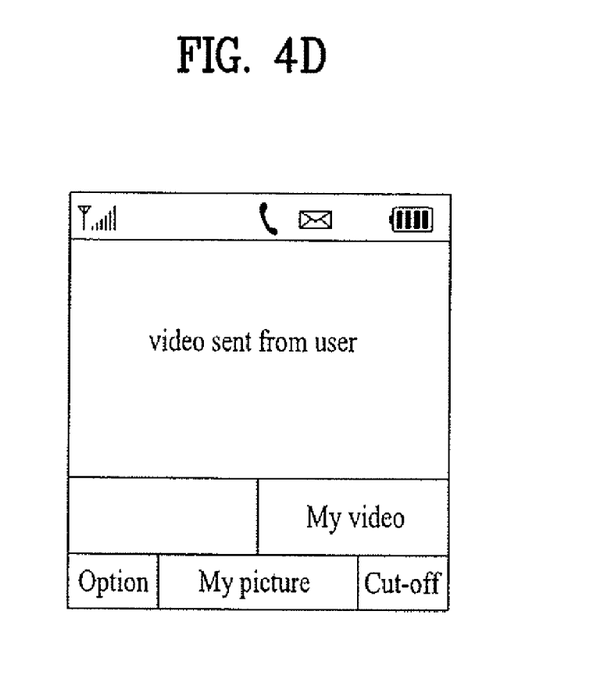
FIG. 4D is a diagram of a screen for displaying a status of a video output unit in video communications of a mobile communication terminal according to a fourth embodiment of the present invention.

The correspondent mobile communication terminal, as shown in FIG. 4C, outputs the synthetic video received from the mobile communication terminal 10. The synthetic video is generated from synthesizing the video of the broadcast program received by the mobile communication terminal 10 with the video of the user of the mobile communication terminal 10. In case of performing general video communications with the mobile communication terminal 10, the correspondent mobile communication terminal, as shown in FIG. 4D, outputs the video of the user of the mobile communication terminal 10.

And, according to the control signal of the control unit 130, the AVC 140 sets an input audio of the video call to the audio of the broadcast program inputted from the codec 160.

According to a user's selection, the control unit 130 decides whether to transmit the user's video (S207).

In case of deciding not to transmit the user's video, the control unit 130 sets the input video of the video call to the video of the broadcast program inputted from the codec 160 via the video processing unit 150. And, in case of deciding not to transmit the user's video, the control unit 130 sets the input audio of the video call to the audio of the broadcast program inputted from the codec 160.

According to the control signal of the control unit 130, the transceiver unit 110 sets the input video of the video call to the video of the broadcast program and then transmits it to the correspondent mobile communication terminal (S208). According to the control signal of the control unit 130, the transceiver unit 110 sets the input audio of the video call to the audio of the broadcast program and then transmits it to the correspondent mobile communication terminal (S208).

Figure 4E:
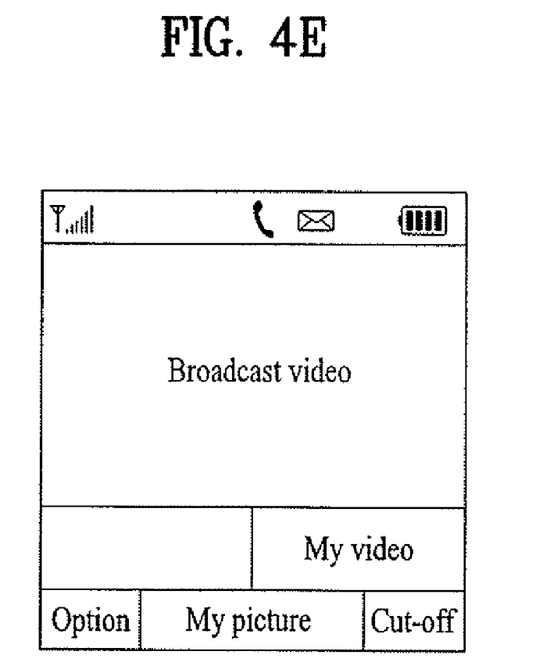
FIG. 4E is a diagram of a screen for displaying a status of a video output unit in video communications of a mobile communication terminal according to a fifth embodiment of the present invention.

If so, the correspondent mobile communication terminal, as shown in FIG. 4E, outputs the video of the broadcast program received from the mobile communication terminal 10.

According to a user's selection, the control unit 130 decides whether to stop the transmission of the broadcast program (S209).

In case of deciding to stop the transmission of the broadcast program, the control unit 130 stops the transmission of the broadcast program and then returns to the original video communications to continue or terminate.

In case of deciding to transmit the user's video, the control unit 130, according to a user's selection, the control unit 130 decides whether to stop the transmission of the broadcast program (S210).

In case of deciding not to stop the transmission of the broadcast program, the control unit 130 keeps monitoring whether there is an input signal for the transmission stop of the user's video or the broadcast program while transmitting the synthetic video.

In case of deciding to stop the transmission of the broadcast program, the control unit 130 stops the transmission of the broadcast program and then returns to the original video communications to continue or terminate.

A method of transmitting a broadcast program using a video call according to another embodiment of the present invention is explained in detail with reference to FIG. 3 as follows.

Figure 3:
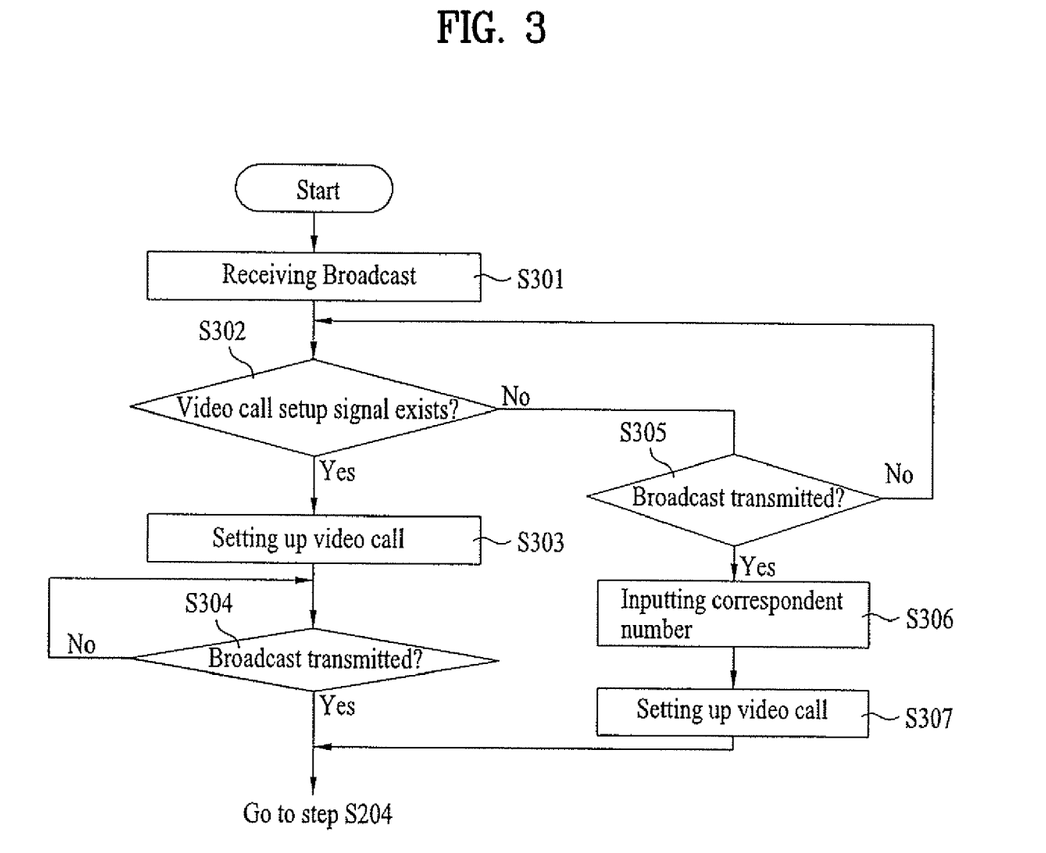
FIG. 3 is a flowchart of a method of transmitting a broadcast program using a video call according to another embodiment of the present invention.

FIG. 3 is a flowchart of a method of transmitting a broadcast program using a video call according to another embodiment of the present invention.

Referring to FIG. 3, the broadcast receiving unit 115 receives a broadcast program via the second antenna 117 (S301).

Figure 5A:
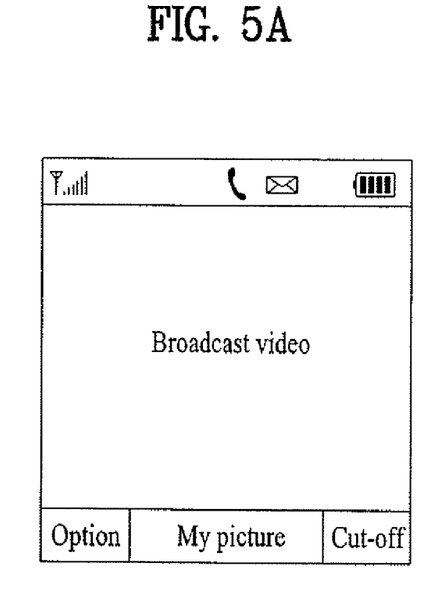
FIG. 5A is a diagram of a screen for displaying a status of a video output unit in a broadcast reception of a mobile communication terminal according to a first embodiment of the present invention.

The video output unit 182, as shown in FIG. 5A, outputs a video of the received broadcast program. In this case, the outputted video is the video decoded by the codec 160.

The control unit 130 decides whether there is a calling or called signal to set up a video call (S302).

The calling signal means a signal requesting a video call to a correspondent mobile communication terminal. And, the called signal means a signal requesting a video call to the mobile communication terminal 10 from the correspondent mobile communication terminal.

In case of deciding that there is the calling or called signal, the control unit 130 initiates video communications by setting up the video call via the transceiver unit 110 (S303).

According to a user's selection, the control unit 130 decides whether to transmit the received broadcast program to the correspondent mobile communication terminal (S304).

In case of deciding to transmit the received broadcast program to the correspondent mobile communication terminal, the control unit 130 controls the steps following the step S204 to be executed.

In case of deciding not to transmit the received broadcast program to the correspondent mobile communication terminal, the control unit 130 keeps monitoring whether a transmission signal for the broadcast program is generated while performing the video communications with the correspondent mobile communication terminal.

In case of deciding that the calling or called signal does not exist, the control unit 130 decides whether to transmit the received broadcast program to the correspondent mobile communication (S305).

In case of deciding not to transmit the received broadcast program to the correspondent mobile communication terminal, the control unit 130 goes back to the step S302 and then keeps monitoring whether there is the calling or called signal for the video call while receiving the broadcast program.

In case of deciding to transmit the received broadcast program to the correspondent mobile communication terminal, the control unit 130 inputs a number of the correspondent mobile communication terminal to which the broadcast program shall be transmitted (S306).

The control unit 130 sets up a video call with the correspondent mobile communication terminal corresponding to the inputted number (S307).

Figure 5B:
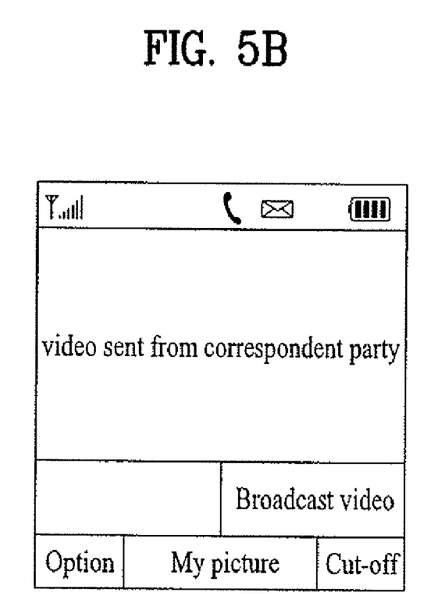
FIG. 5B is a diagram of a screen for displaying a status of a video output unit in a broadcast reception of a mobile communication terminal according to a second embodiment of the present invention.

In this case, the video output unit 182, as shown in FIG. 5B, displays a video received from the correspondent mobile communication terminal on a portion of the screen and the video of the currently received broadcast program on another portion of the screen.

Once the video call is set up, the control unit 130 controls the steps following the step S204 to be executed.

Figure 6:
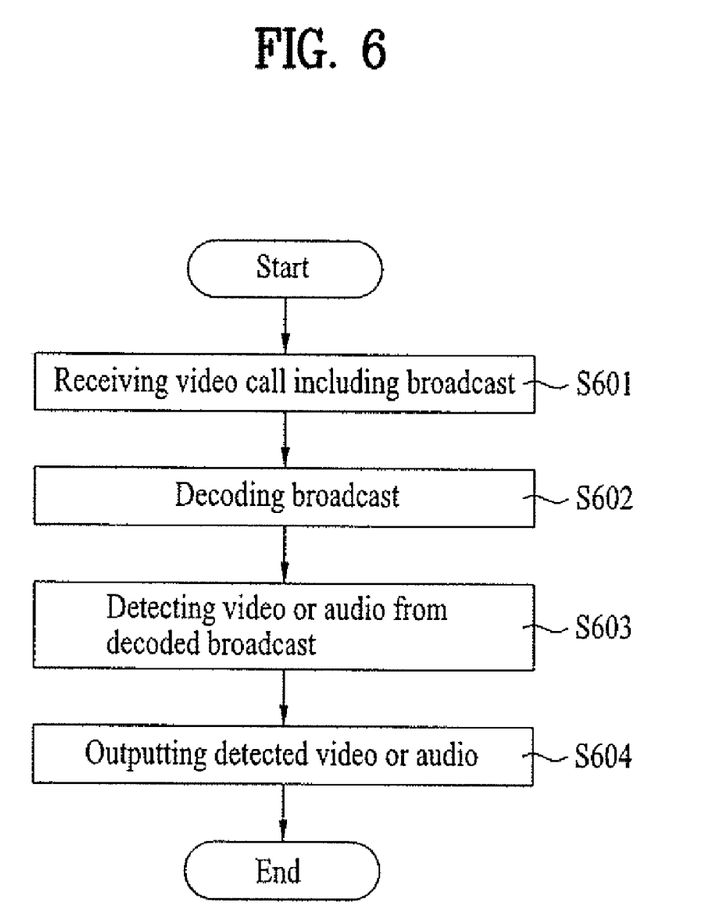
FIG. 6 is a flowchart of a method of receiving a broadcast program using a video call according to one embodiment of the present invention

Referring to FIG. 6, a mobile communication terminal receives a video call including broadcast programe (S601).

The mobile communication terminal decodes the broadcast program (S602).

The mobile communication terminal detects video or audio from the decoded broadcast program (S603).

The mobile communication terminal outputs the detected video or audio as output video or output audio of the video call (S604).

The mobile communication terminal outputs both a user video and the detected video simultaneously. The user video is the video of the user of transmission terminal. The transmission terminal transmits the video call.

The mobile communication terminal, as shown in FIG. 4C, outputs the synthetic video received from the transmission terminal. The synthetic video is generated from synthesizing the video of the broadcast program received by the transmission terminal with the video of the user of the transmission terminal. In case of performing general video communications with the transmission terminal, the mobile communication terminal, as shown in FIG. 4D, outputs the video of the user of the transmission terminal.

If so, the mobile communication terminal, as shown in FIG. 4E, outputs the video of the broadcast program included in video call received from the transmission terminal.

Accordingly, the present invention provides the following effects or advantages.

First of all, a broadcast program received by a mobile communication terminal can be transmitted to a correspondent mobile communication terminal by real time using video communications.

Secondly, a mobile communication terminal failing to support a broadcast program receiving function is able to receive a real-time broadcast program from a correspondent mobile communication terminal in video communication and to provide the received real-time broadcast program to a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal, comprising:
   a transceiver to establish a video call connection;
   a broadcast receiver to receive a broadcast program signal;
   a first codec to decode the received broadcast program signal;
   a video input unit receiving an external video;
   a video processor to synthesize the received broadcast program signal and the external video into a synthesized video;
   a second codec to code at least one of the external video or the synthesized video; and
   a controller to control the first codec and the second codec and the video processor, wherein when the video call connection exists simultaneously with a reception of the broadcast program signal, the synthesized video is provided to the second codec for transmission through the transceiver using the video call connection.

2. The mobile communication terminal of claim 1, wherein the synthesized video includes the external video on a partial area of the video of the received broadcast program signal.

3. The mobile communication terminal of claim 2, wherein the synthesized video is provided on a display of the mobile communication terminal during the video call connection.

4. The mobile communication terminal of claim 1, wherein a video of the received broadcast program signal is provided on a display of the mobile communication terminal during the video call connection.

5. The mobile communication terminal of claim 1, wherein an audio of the received broadcast program signal is provided as an audio output of the mobile communication terminal during the video call connection.

6. A method of video communications, comprising:
   determining whether a video call connection through a transceiver and a broadcast program signal reception through a broadcast receiver exist simultaneously for a mobile communication terminal;
   synthesizing a video of a decoded broadcast program signal and an externally received video into a synthesized video by a video processor;
   providing the synthesized video as an input to a first codec for the video call connection; and
   transmitting an output based on the synthesized video of the first codec through the transceiver for transmission through the video call connection when the video call connection exists simultaneously with the reception of the broadcast program signal.

7. The method of claim 6, wherein in the synthesized video includes the externally received video displayed on a partial area of the video of the broadcast program signal.

8. The method of claim 6, wherein a video of the received broadcast program signal is provided on a display of the mobile communication terminal.

9. The method of claim 6, wherein an audio of the received broadcast program signal is provided as an audio output of the mobile.

10. The method of claim 6, further comprising decoding a broadcast program signal received through a broadcast receiver by a second codec to provide the decoded broadcast program signal.

* * * * *